United States Patent [19]

Watanabe et al.

[11] Patent Number: 4,944,459
[45] Date of Patent: Jul. 31, 1990

[54] MOUNTING/DISMOUNTING SYSTEM FOR MOUNTING AND DISMOUNTING A SPRAY GUN ON AND FROM A PAINTING ROBOT

[75] Inventors: Takashi Watanabe; Fujio Kobayashi, both of Yokohama, Japan

[73] Assignee: Tokico Ltd., Japan

[21] Appl. No.: 285,069

[22] Filed: Dec. 15, 1988

[30] Foreign Application Priority Data

Dec. 18, 1987 [JP] Japan .......................... 62-192632[U]

[51] Int. Cl.⁵ ..................... B05B 13/00; B67D 5/00
[52] U.S. Cl. ..................... 239/305; 901/43; 403/14; 403/322; 403/329; 403/330; 239/587
[58] Field of Search ................ 403/322, 330, 329, 24, 403/13, 14; 901/43; 239/305, 587; 118/302, 323

[56] References Cited

U.S. PATENT DOCUMENTS

| | | | |
|---|---|---|---|
| 4,342,535 | 8/1982 | Bartlett et al. | 901/43 X |
| 4,498,414 | 2/1985 | Kiba et al. | 901/43 X |
| 4,532,148 | 7/1985 | Vecellio | 901/43 X |
| 4,682,182 | 7/1987 | Oyama et al. | 901/43 X |
| 4,693,664 | 9/1987 | Schweiker | 901/43 X |
| 4,702,666 | 10/1987 | Iwao et al. | 901/43 X |
| 4,714,044 | 12/1987 | Kikuchi et al. | 901/43 X |
| 4,721,630 | 1/1988 | Takeo et al. | 901/43 X |
| 4,762,013 | 8/1988 | Peter et al. | 901/43 X |
| 4,770,120 | 9/1988 | Komatsu et al. | 901/43 X |
| 4,779,804 | 10/1988 | Baba et al. | 901/43 X |
| 4,785,760 | 11/1988 | Tholome | 901/43 X |

Primary Examiner—Randolph A. Reese
Assistant Examiner—Carol I. Bordas
Attorney, Agent, or Firm—Andrus, Sceales, Starke & Sawall

[57] ABSTRACT

A mounting/dismounting system for mounting and dismounting a spray gun carried on an adapter on and from an arm of a robot comprises a base extending horizontally and having a flat top surface defined by a first side facing the robot and a second side opposing the first side for supporting the adapter when the spray gun is placed on the base. The flat top surface is further defined with a predetermined position on which the adapter is to be held when the spray gun carried by the adapter is waiting for mounting on the arm of the robot. Detector is provided on the top surface of the base so as to be actuated by the adapter when the adapter is moved excessively towards the second side on the top surface and for producing an output signal indicating that the adapter carrying the spray gun is displaced from the predetermined position towards the second side of the top surface, and a controller connected to the detector and to the robot is provided for stopping the movement of the arm responsive to the output signal from the detector.

11 Claims, 7 Drawing Sheets

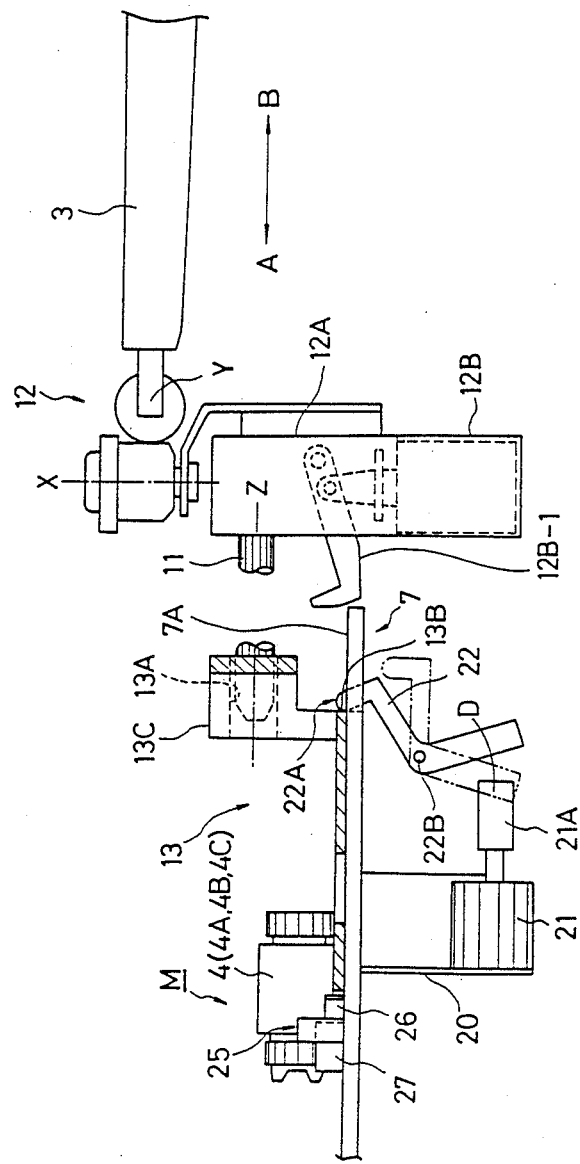

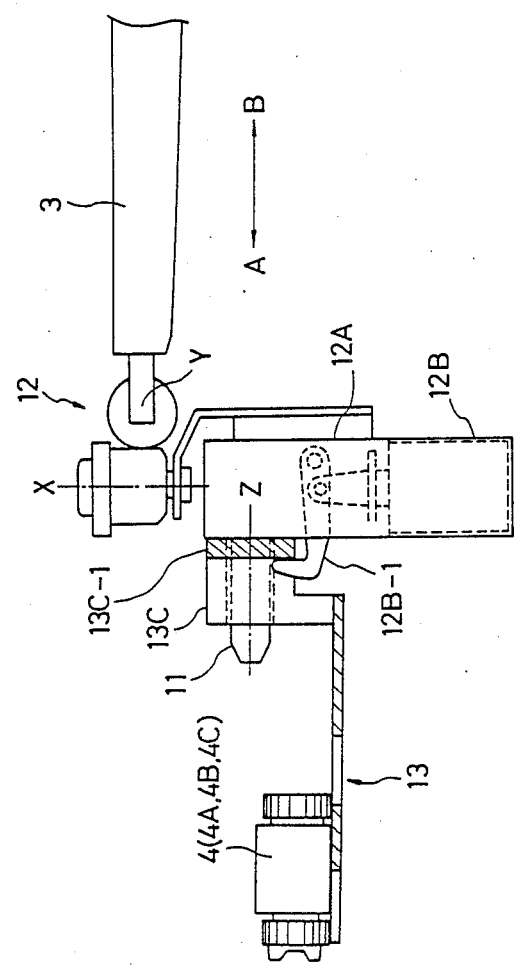

MOUNTING/DISMOUNTING SYSTEM FOR MOUNTING AND DISMOUNTING A SPRAY GUN ON AND FROM A PAINTING ROBOT

BACKGROUND OF THE INVENTION

The present invention generally relates to industrial robots used for painting a work in different colors by selectively using various spray guns, and particularly to a jig or a mounting/dismounting system used for mounting and dismounting a spray gun on such a painting robot.

In production of automobiles and the like, there is a demand to manufacture automobiles having different colors on a single production line. When performing painting in a plurality of colors using a single painting robot such a production line, a plurality of spray guns are used in correspondence to the color to be used. Thus, a desirable spray gun is selected and mounted on an arm of the painting robot. By repeating such a mounting procedure, the spray gun held by the robot is replaced and the color to be painted on the work is changed.

The spray gun is mounted on an adapter adapted to be mounted on the arm of the painting robot. When mounting such a spray gun on the arm of the robot, the arm is moved in accordance with a data fed to the robot previously by a teaching procedure, so that a tip end of the arm gradually approaches the adapter carrying the desired spray gun. Such an adapter is placed on a base. In other words, a plurality of adapters respectively carrying spray guns for different colors are placed in a row on respective predetermined positions on the base. However, such a procedure requires a precise control of the arm particularly when the arm engages with the adapter. In order to perform such a precise control of the arm of the robot, numerous data points specifying the movement of the arm having to be given. This means that the number of data points to be fed to the robot increases, and as a result, the speed of movement of the arm is slowed. Such a slow-down in the movement of the arm leads to a decrease in the efficiency of the painting operation.

Further, the conventional procedure to mount the spray gun on the arm of the robot sometimes causes a problem when the arm has accidentally moved the gun excessively, passing through a desired position. Such an accidental movement of the arm is particularly harmful when the arm is moved so as to engage with the adapter held on the predetermined position of the base. When the arm is moved excessively and the spray gun has moved passing through the predetermined position, the gun or the adapter carrying the gun may collide with various apparatus or devices provided on the base in a vicinity of the spray gun. In the moment, there is so far no solution proposed to prevent the movement of the arm which leads to the harmful collision of the spray gun with other apparatus and devices.

SUMMARY OF THE INVENTION

Accordingly, it is a general object of the present invention to provide a novel and useful mounting/dismounting system for a painting robot for mounting and dismounting a spray gun on and from an arm of the painting robot wherein the aforementioned problems are eliminated.

Another and more specific object of the present invention is to provide a mounting/dismounting system for mounting and dismounting a spray gun on and from an arm of a painting robot wherein damages to various apparatus and devices provided on a base supporting the spray gun due to accidental movement of the arm at the time of mounting or dismounting the spray gun on and from the arm of the robot is positively prevented.

Another object of the present invention is to provide a mounting/dismounting system for a painting robot wherein a teaching procedure to feed data points specifying the movement of the arm is simplified and a quick dismounting and mounting of spray gun is achieved.

Another object of the present invention is to provide a mounting/dismounting system comprising a base for supporting an adapter carrying a spray gun thereon and adapted to be held by an arm of the robot, detecting means provided on said base for detecting a displacement of the mounting member when the arm has moved the adapter on the base accidentally from a predetermined position, and control means for stopping the movement of the arm responsive to an output signal of the detecting means detecting the displacement of the mounting member. According to the present invention, accidental movement of the arm moving the adapter carrying the spray gun from said predetermined position towards various apparatus and devices provided in a vicinity of the gun is prevented as the arm is immediately stopped by the control means when it is detected that the mounting member is displaced from the predetermined position. Further, as a result of the present invention, extremely precise position control of the arm hitherto required at the time of mounting and dismounting the spray gun on and from the arm of the robot may be omitted, as the arm is automatically stopped whenever the adapter carrying the spray gun is displaced accidentally by the arm. As a result, feeding of data to specify the movement of the arm by teaching the robot is simplified and the robot can move the arm faster when holding the adapter carrying the spray gun or when dismounting the adapter. Thus, the efficiency in the painting operation performed by the robot is significantly improved.

Still other objects and further features of the present invention will become apparent from the following detailed description when read in conjunction with attached drawings.

BRIEF DESCRIPTION OF THE DRAWINGS

FIG. 2(A) is a side view showing mounting/dismounting of a spray gun on and from an arm of a robot of FIG. 1 using the mounting/dismounting system of the present invention;

FIG. 2(B) is a side view showing the spray gun mounted on the arm of the robot;

DETAILED DESCRIPTION

Figure 1:
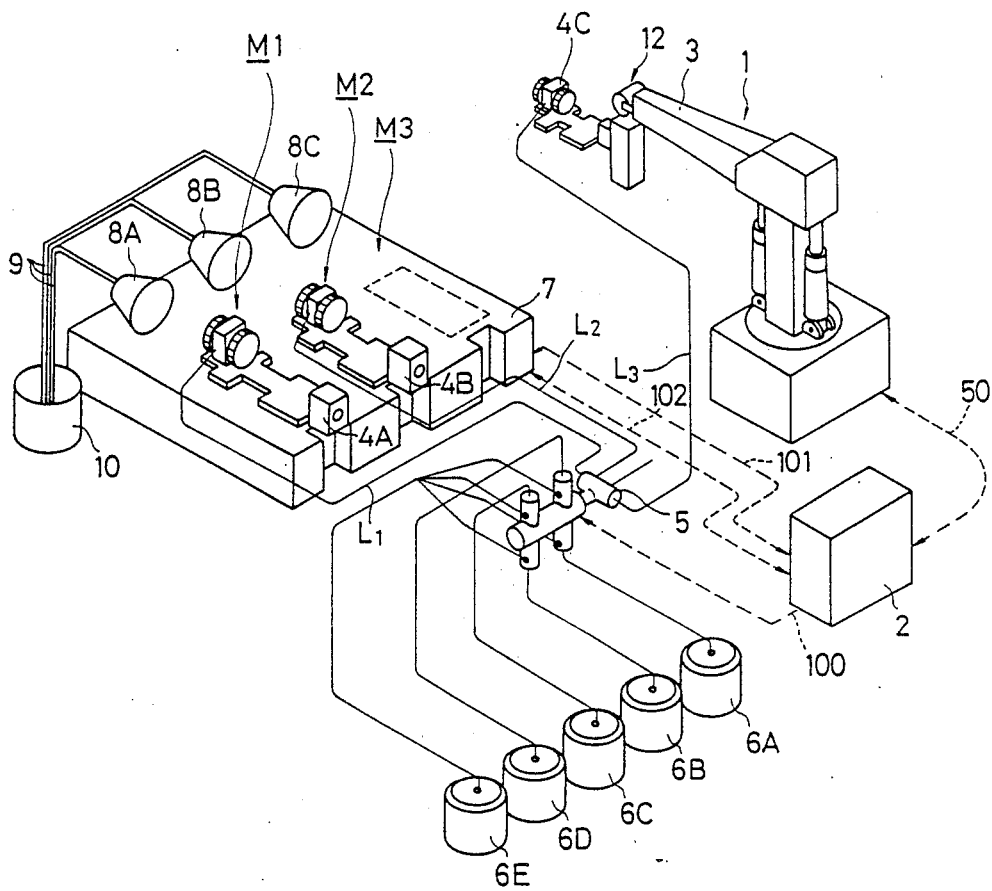
FIG. 1 is a perspective view showing an overall construction of the painting robot system to which the present invention is applicable.

FIG. 1 shows a overall construction of a painting robot system to which the present invention is applicable. Referring to the drawing, a robot 1 moves a spray gun 4C held on an end of an arm 3 in accordance with a control signal supplied from a controller 2 of the robot. The controller 2 is connected to the robot by a line 50. The robot 1 is fed by data specifying the movement of the arm 3 of the robot by a teaching procedure in which a human operator moves the arm 3 of the robot in a path to perform a desired painting work. The spray gun 4C and other spray guns 4A and 4B are connected by paint supply hoses L1–L3 to a paint feed system which feeds paints of different colors stored in respective tanks 6A–6D together with a thinner held in a tank 6E to the spray guns 4A–4C through a valve 5. The valve 5 is actuated by a color selection signal supplied thereto from the controlled 2 via a line 100, and as a result of the actuation of the valve 5, a desired spray gun is connected to a desired tank.

As already described, the tanks 6A–6D store paints of various colors used for painting, and the tank 6E stores the thinner used for cleaning the inside of the hoses as well as the switching valve 5 of the paint feed system at the time of switching a path of paint along which the paint is fed to the gun. The spray guns 4A–4C are placed on a flat base 7 horizontally in a row with a predetermined separation, and recovery cones 8A–8C are disposed in front of respective predetermined positions M1, M2 and M3 of the spray guns 4A–4C defined on the base 7 so as to recover the paint or thinner when sprayed from the spray gun 4A–4C on the base 7. The paint or thinner thus recovered by the recovery cones 8A–8C is sent to a recovery tank 10 after passing through a recovery hose 9 connecting the cones 8A–8C to the tank 10. The paint or thinner may be delivered to the tank 10 by the gravity or by applying vacuum using a suitable suction means (not illustrated).

Next, an adapter 13 for carrying the spray gun 4 and which is adapted to be mounted on the arm 3 of the robot 1 will be described together with various cooperating parts provided at the end of the arm 3 with reference to FIGS. 2(A), 2(B) and FIG. 3. Referring particularly to FIG. 2(A), the arm 3 has a wrist mechanism 12 on its tip end and the wrist mechanism 12 includes a connecting mechanism 12A carrying a connecting shaft 11. The mechanism 12 is provided rotatably about three mutually perpendicular axes X, Y, and Z relative to the arm 3 and thus the shaft 11 is rotated freely in a three dimensional space at the end of the arm. The shaft 11 is inserted in a corresponding hole 13A of a connecting member 13C which is a part of the adapter 13 carrying the spray gun 4 when mounting the gun on the arm 3.

Figure 3:
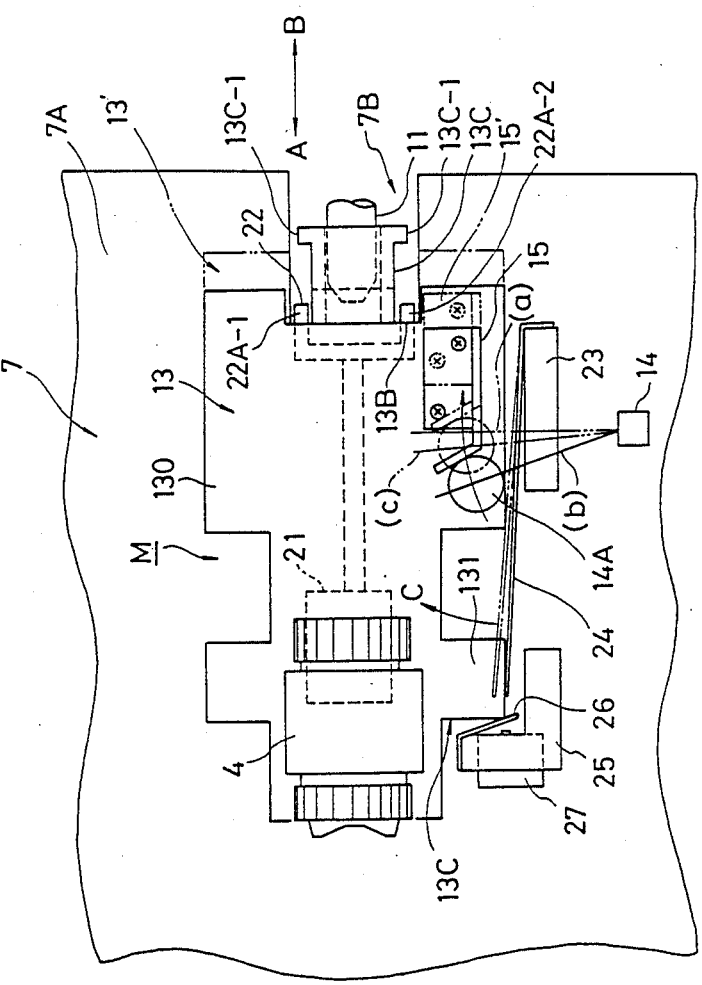
FIG. 3 is a plan view showing the connection of the spray gun on the arm of the robot using the system of the present invention.

FIG. 3 shows the adapter 13 in a plan view. Referring to the drawing, the adapter 13 comprises a generally flat body 130 carrying on its front side the spray gun 4 and on its rear side the aforementioned connecting member 13C which extends upwards as can be seen from a side view of FIG. 2(A). As already described, the connecting member 13C has the hole 13A for accepting the shaft 11 of the arm 3.

The connecting mechanism 12A of the robot has an air cylinder 12B therein as illustrated in FIGS. 2(A) and (B) by a broken line, and the air cylinder 12B moves an actuation arm $12B_{-1}$ upwards when holding the adapter 13 during the painting work and moves the actuation arm $12B_{-2}$ downwards when mounting or dismounting the adapter 13 on and from the shaft 11 of the arm 3. FIG. 2(B) shows a state in which the adapter 13 is mounted on the shaft 11 of the arm 3 of the robot. The air cylinder 12B of the connecting mechanism 12A pushes the arm $12B_{-1}$ upwards and the arm $12B_{-1}$ holds the connecting member 13C to which the shaft 11 is inserted firmly on the wrist mechanism 12 of the arm 3 by engaging with a pair of lateral projections $13C_{-1}$ extending laterally from the member 13C as shown in FIG. 3. When mounting or dismounting the adapter 13 on and from the shaft 11, the arm $12B_{-1}$ is lowered by the air cylinder 12B as in FIG. 2(A).

Next, the mounting/dismounting system of the present invention will be described with reference to FIGS. 2(A), 2(B) and 3. The system of the present invention comprises the aforementioned flat base 7 for supporting the adapter 13 which carries the spray gun 4 thereon. In correspondence to the number of colors to be used in the painting work, a plurality of adapters 13 are used to carry spray guns for respective colors. The adapter 13 is placed on a top surface 7A of the base 7 in a row with a predetermined separation therebetween, and is moved along the top surface 7A when pushed by the shaft 11 of the arm 3 in a direction A–B as indicated in the drawings. It should be noted that the base 7 has a U-shaped cutout 7B on its first side facing the direction B as illustrated in FIG. 3 so as to receive the mechanism 12A at the end of the arm 3 when the arm 3 is moved towards the base 7 for mounting or dismounting the spray gun 4. The base 7 is further defined by a second side opposite to said first side as shown in FIG. 1. Further, the base 7 has on its top surface 7A a limit switch 14 (FIG. 3) having an arm 14A. The arm 14A extends horizontally from the limit switch 14 and is actuated by a striker 15 (FIG. 3) provided on the adapter 13 when the adapter is moved along the base 7 by the arm 3 of the robot and has reached a preliminary predetermined position slightly offset in the direction B from a predetermined position M defined on the surface 7A of the base 7. In FIG. 3, this preliminary predetermined position of the adapter 13 is represented by a one-dotted line and is given a reference numeral of 13'. Similarly, the position of the striker 15 in this state is represented by a reference numeral of 15'. In order to avoid complexity in the drawing, only a part of the adapter 13 is illustrated. It should be noted that the position M in FIG. 2(A) and FIG. 3 represents the positions M1–M3 shown in FIG. 1. In the drawing, the arm 14A is represented only schematically. Thus, the limit switch 14 is turned ON when the lever 14A has reached a position indicated by a symbol (c) as it is moved from a first position represented by a symbol (a) to a second position represented by a symbol (b). The switch 14 is connected to the controller 2 by a line 101 shown in FIG. 1 and the controller 2 is informed that the adapter 13 has reached the aforementioned preliminary predetermined position when the switch 14 is turned ON.

When changing the spray gun with another gun so as to change the color to be painted, the spray gun held on the arm 3 of the robot is returned to the base 7 at first. Thus, the gun is moved by the arm 3 such that the adapter 13 makes a tangential contact with the base 7. More specifically, the adapter 13 is moved on the base 7 along its top surface 7A in the direction A by the arm 3. Thus, the arm 14A of the limit switch 14 is actuates by the striker 15 on the adapter 13 and the limit switch 14 is turned ON when the adapter 13 is returned to the predetermined position. Responsive to the turning ON of the limit switch 14, the controller 2 stops the movement of the arm 3 driving the adapter 13 forward, and at the same time the air cylinder 12B in the connecting mechanism 12A is moved downwards. As a result, the arm $12B_{-1}$ is moved downwards and the adapter 13 is disengaged from the shaft 11 and the wrist mechanism 12.

Next, a mechanism to remove the adapter 13 from the shaft 11 of the arm 3 will now be described. FIG. 2(A) shows another air cylinder 21 disposed below the base 7. The air cylinder 21 is connected to the base 7 via a mounting bracket 20. The air cylinder 21 has an actuation rod 21A which is moved in the A-B direction, and the actuation rod 21A is connected to an end of an actuation arm 22 which is held rotatably about a pin 22B. Thus, the air cylinder 21 moves the actuation arm 22 about the pin 22B. The other end 22A of the arm 22 is branched into two end parts $22A_{-1}$ and $22A_{-2}$ as can be seen in FIG. 3, and these end parts push a rear end 13B of the adapter 13 held on the base 7 horizontally in the direction A. The end 13B faces the robot 1 as illustrated in FIG. 3. In FIG. 2(A), the state of the arm 22 when the actuation rod is fully displaced outwards from the cylinder 21 is represented by a solid line and the state of the arm when the actuation rod 21A is fully pulled into the air cylinder 21 is represented by a broken line. The position of the arm 22 represented by the solid line in FIG. 2(A) will be referred to as a COMPLETED position and the position of the arm 22 represented by the broken line in FIG. 2(A) will be referred to as a WAITING position. When the arm 22 is moved in a direction D in FIG. 2(A) from the WAITING position to the COMPLETED position, the ends $22A_{-1}$ and $22A_{-2}$ of the arm 22 are engaged with the rear end 13B of the adapter 13 (FIG. 3) and the adapter 13 is pushed in the direction A as already described.

The base 7 has a guide member 23 on its top surface and the guide member 23 carries thereon a leaf spring 24 extending generally in the A-B direction as illustrated in FIG. 3. When the adapter 13 is pushed by the arm 22 in the direction A on the base 7, the adapter 13 is urged by the leaf spring 24 in a direction C as shown in FIG. 3, and adapter 13 is centered.

It should be noted that FIG. 2(A) and FIG. 3 show the adapter 13 in a state in which the adapter 13 is fully displaced in the direction A by the arm 22 and the arm 22 is in the COMPLETED position. In this state, the shaft 11 is partially drawn out from the adapter 13 as the adapter 13 is displaced in the direction A by the action of the arm 22. Further, in this state, the adapter 13 is located at the predetermined position M on the base 7 and a front side 13C of a lateral projection 131 formed on the body 130 of the adapter 13 is located close to a stopper 25 provided on the base 7 by a separation of a few millimeters. In this state, the arm 3 is retracted and the shaft 11 is completely disengaged from the adapter 13.

When mounting a spray gun on the arm 3, the arm 3 is moved such that the shaft 11 enters into the corresponding hole 13A of the adapter 13 waiting for insertion of the shaft 11 at the predetermined position M on the base 7. If the shaft 11 misses the hole 13A when the arm 3 is moved towards the adapter 13, the adapter 13 is pushed forward from the predetermined position M. As there is provided a recovery cone and the like at the front side of the spray gun when the adapter 13 is in the position M, such an excessive movement of the adapter 13 and thus the excessive movement of the gun 4 invites a substantial risk that the recovery cone and other apparatus and devices in front of the gun are seriously damaged by collision. In order to prevent such a collision, the system of the present invention uses a switch 27 carrying a leaf spring 26. The switch 27 is provided on the stopper 25 on the base 7 and the leaf spring 26 has an end connected to the switch 27 so as to extend obliquely from the swith 27. The other end of the spring 26 is free. When deformed, the spring actuates the switch 27 mechanically and the switch 27 is turned ON. The switch 27 and the leaf spring 26 are disposed in front of the lateral projection 131 of the adapter 13 when the adapter 13 is in the position M so as to face the front side 13C, and the switch 27 is turned ON when the adapter 13 is displaced forward from the predetermined position M and has collided on the leaf spring 26. Such a displacement occurs for example when the shaft 11 has missed the proper engagement with the corresponding hole 13A of the adapter 13. The switch 27 is connected to the controller 2 by a line 102 shown in FIG. 1, and whenever the adapter 13 has collided with the leaf spring 26 and the switch 27 is turned ON, the controller 2 of the robot system immediately stops the movement of the arm 3 of the robot 1.

Figure 4A:
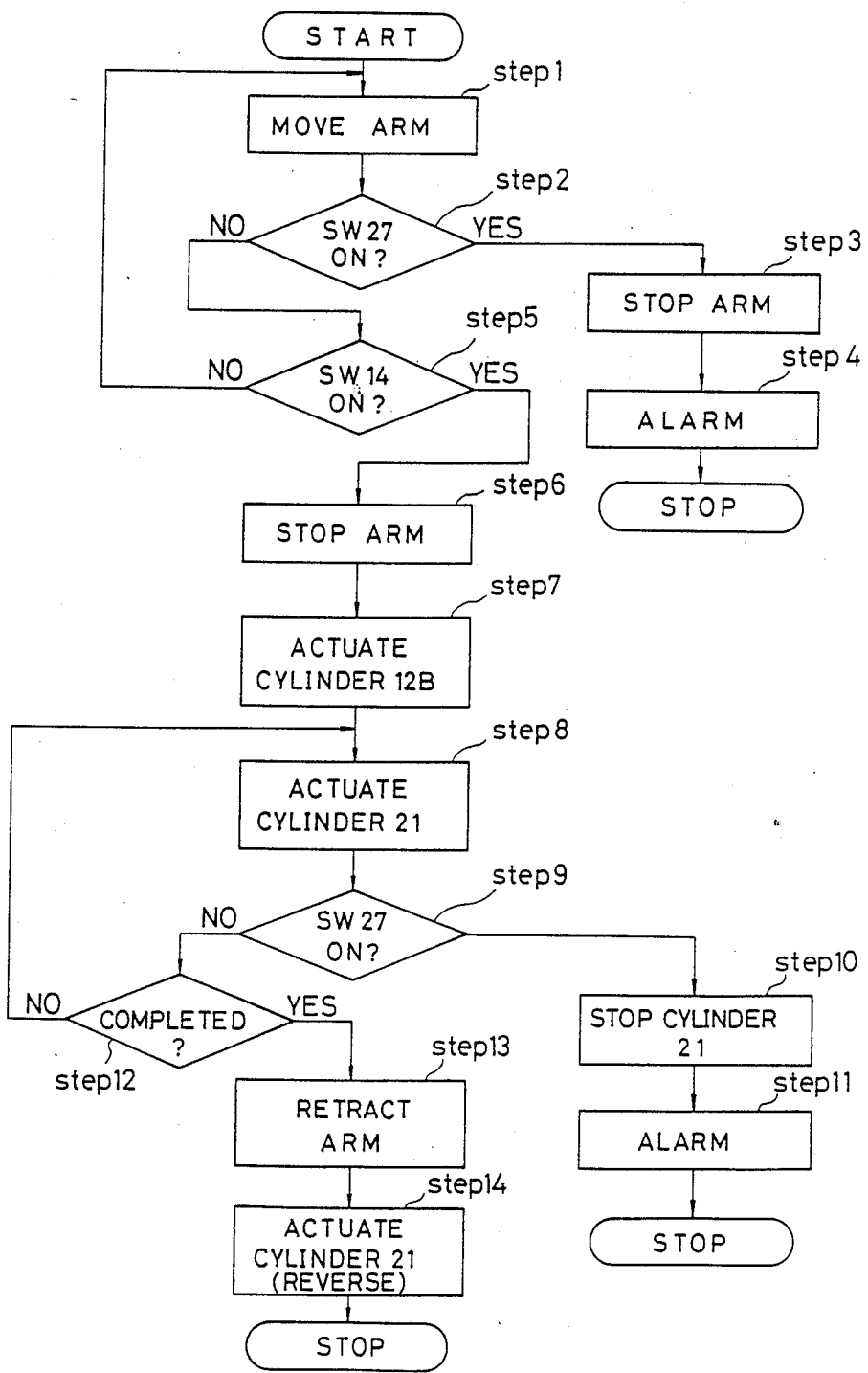
FIG. 4(A) and FIG. 4(B) are flowcharts showing the operation of the mounting/dismounting system of the present invention.
Figure 4B:
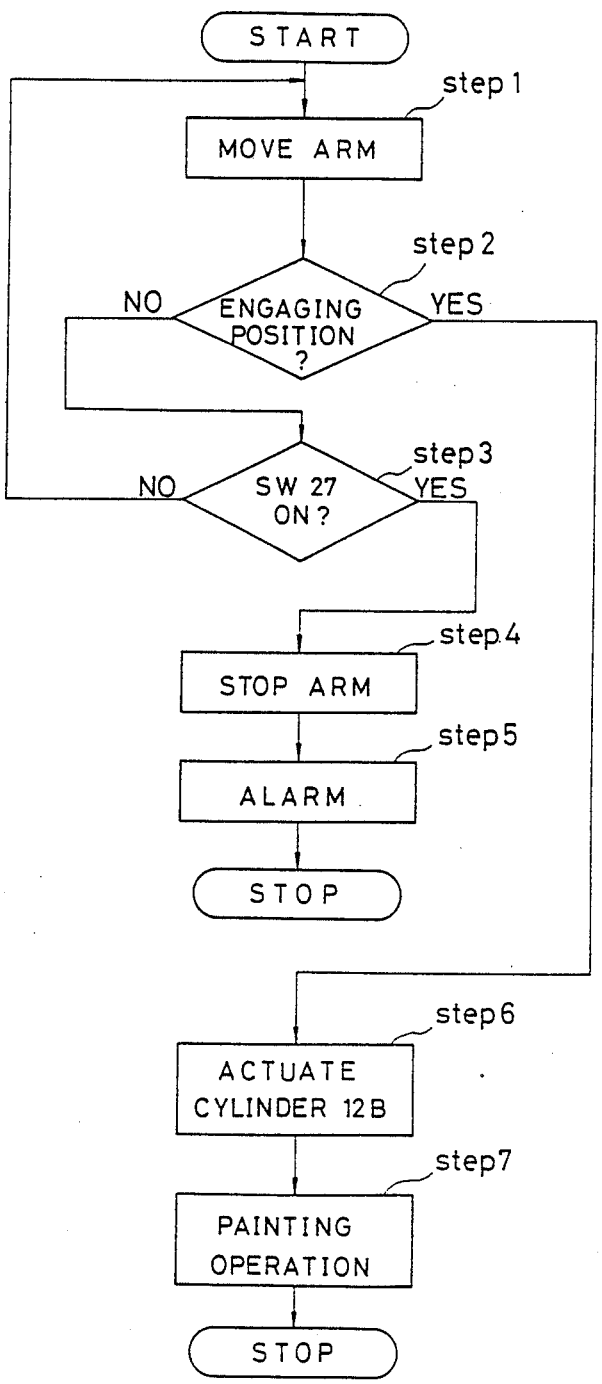

Next the operation of the mounting/dismounting system of the present invention to prevent the collision will be described with reference to a flowchart of FIGS. 4(A) and (B) showing programs stored in the controller 2 for controlling the movement of the arm 3. The flowchart in FIG. 4(A) shows the control of the arm 3 at the time of dismounting the spray gun and the flowchart of FIG. 4(B) shows the control of the arm 3 at the same time of mounting the spray gun on the arm. Referring to FIG. 4(A) first, the arm 3 of the robot 1 is moved in a step 1 towards the base 7 and the state of the switch 27 is monitored in a step 2. When the switch 27 is turned ON, this means that some object is on the base 7 and urging the switch 27. Thus, whenever it is discriminated that the switch 27 is turned ON, the movement of the arm 3 is immediately stopped in a step 3 and a warning is issued to the operator in a step 4. On the other hand, when it is decided that the switch 27 is not turned ON in the step 2, the movement of the arm 3 in the step 3 is continued, and the adapter 13 is placed on the base 7 and is moved along the top surface of the base 7. In a step 5, the state of the switch 14 is monitored. When the switch 14 is turned ON responsive to the actuation of the lever 14A of the switch 14 by the striker 15 of the adapter 13, the arm is stopped in a step 6 and the air cylinder 12B is actuated in a step 7 so that the lever $12B_{-1}$ is lowered. As a result of this, the adapter 13 is disengaged from the shaft 11 of the arm 3. Next, the air cylinder 21 is actuated in a step 8 and the arm 22 moved from the WAITING position towards the COMPLETED position. While the arm 22 is moving, the state of the switch 27 is monitored in a step 9. When the switch 27 is turned ON, this means that a part of the adapter 13 has hit the switch 27. Thus, the movement of the adapter 13 is stopped immediately in a step 10 and a warning is issued to the operator. On the other hand, when the switch 27 is not turned ON, the arm 22 is moved further towards the COMPLETED position by repeating the step 8 until it is discriminated in a step 12 that the arm 22 has reached the COMPLETED position. During this procedure, the adapter 13 is pushed forward by the arm 22 and moves in the direction A (forward direction) while receiving a guiding action by the leaf spring 24. Thus, the adapter 13 is urged in the direction C and is positioned properly on the predetermined position M when the arm 22 has reached the COMPLETED position. Then the arm 3 is retracted from the adapter 13 in a step 13. After this procedure, the arm 3 may swing so as to mount another gun 4 carried on another adapter 13. Further, in a step 14, the air cylinder 21 is activated in a reversed direction and the actuation arm 22 is returned to the WAITING position.

FIG. 4(B) shows the flowchart for controlling the arm 3 at the time of re-mounting the spray gun. Referring to the drawing, the arm 3 is moved towards the adapter 13 in a step 1 so that the shaft 11 on the end of the arm 3 enters correctly to the corresponding hole 13A of the adapter 13 positioned on the predetermined position M along a center line of the hole 13A. During this movement, the position of the arm 3 is continuously monitored by the controller 2 in a step 2 and further it is monitored whether the switch 27 is turned ON or not in a step 3. Whenever it is found that the switch 27 is turned ON, the movement of the arm 3 is stopped in a step 4 and the alarm is issued to the operator in a step 5. Thus, even is such a case in which the shaft 11 is inserted into the hole 13A with improper alignment to the center line of the hole 13A, the resultant movement of the adapter 13 towards the direction A passing beyond the position M is prevented as the movement of the arm 3 is immediately stopped responsive to the detection of the turning ON of the switch 27 actuated by the front side of the lateral projection 131 provided on the adapter 13 via the leaf spring 26. Further, the air cylinder 12B of the mechanism 12 on the arm 3 is moved in the reversed direction in a step 6 and the adapter 13 is held firmly on the arm 3. Then, the arm 3 of the robot is moved and the painting operation is performed in a step 7.

As described heretofore, the mounting/dismounting system of the present invention can positively prevent the damaging to the various apparatus and devices provided in front of the spray gun 4 when the spray gun is placed on the predetermined position M of the base 7 even when the gun 4 is accidentally moved forward in the direction A at the time of mounting the spray gun on the arm of the robot. Further, as the safety is secured as such, the extremely precise positioning of the arm of the robot hitherto required at the time of mounting or dismounting of the spray gun on and from the arm of the robot can be omitted. This means that the teaching procedure is simplified and the movement of the arm 3 at the time of the playback mode in which the robot is operated in accordance with the data fed thereto by the teaching is accelerated. This eventually leads to the improvement in the efficiency in the operation of the painting work.

Figure 5:
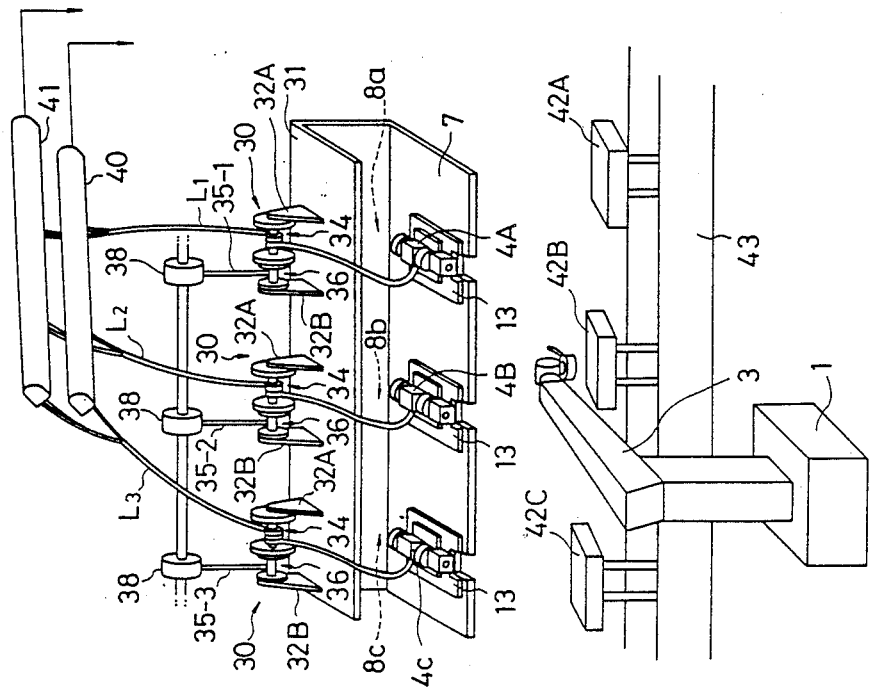
FIG. 5 is a perspective view showing a hose take up mechanism constituting a part of the painting robot system of FIG. 1.

Next, a take-up mechanism 30 for takin up the hose L1-L3 shown in FIG. 1 will be described with reference to FIGS. 5 and 6. In the drawings, those parts constructed identically with those corresponding parts in the drawings described previously are given identical reference numerals and the description thereof will be omitted. In FIG. 5, the recovery cone 8A-8C shown in FIG. 1 are not illustrated for the sake of simplicity of the drawing.

Referring to FIG. 5, another base 31 is provided above the base 7 and the base 31 carries a plurality of take-up mechanisms 30 supported on respective pairs of vertical flanges 32A and 32B extending upwards from the base 31. Each pair of flanges 32A and 32B carry a horizontal shaft 33 (FIG. 5) therebetween and the shaft 33 carries a first drum body 34 for taking up one of the paint supply hoses L1-L3 and a second drum body 36 wound with one of plurality of wires 35-1, 35-2 and 35-3. Each of the wires 35-1-35-3 extends upwards and taken up on one of a plurality of take-up reels 38 located above the take-up mechanism 30. The supply hoses L1-L3 extend upwards and are connected to a paint supply line 40 and an air supply line 41. In FIG. 5, the work to be painted is illustrated by numerals 42A-42C.

Figure 6:
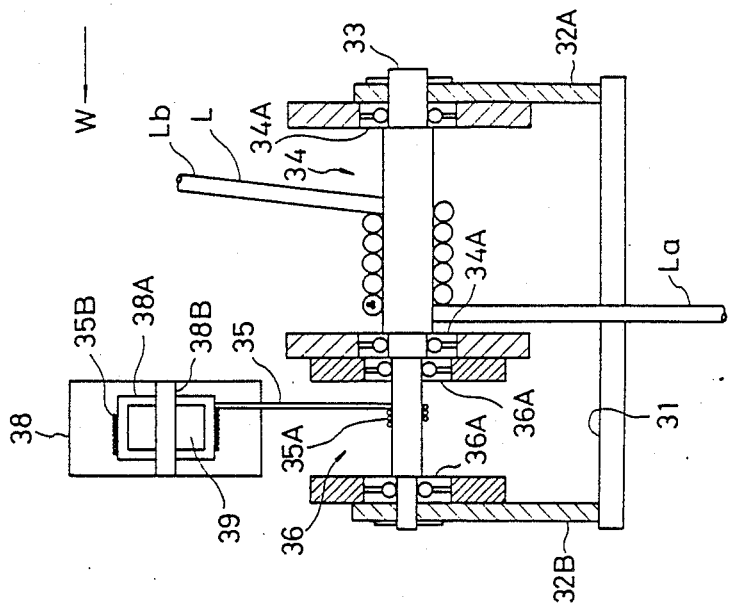
FIG. 6 is a cross sectional view showing an essential part of the take up mechanism of FIG. 5.

FIG. 6 shows the details of the take-up mechanism 30. Referring to FIG. 6, the first drum 34 and the second drum 36 are held on the shaft 33 rotatably via respective ball bearings 34A and 36A. Further, the drum body 34 and the drum body 36 are fixed on the shaft 33 by a screw bolt (not shown) and are rotated unitarily. In FIG. 6, the hose L represented one of the hoses L1-L3 and an end La of the hose L is connected to one of the spray guns 4A-4C. The other end Lb is connected to the valve 5 (FIG. 1) via the paint supply line 40. Further, an end 35A of a wire 35 which represents one of the wires 35-1-35-3 is wound on the drum body 36. The other end 35B of the wire 35 is taken up on the reel 38 which comprises a drum body 38A supported rotatably on a shaft 38B. The drum body 38A is connected to the shaft 38B by a leaf spring 39 and the leaf spring urges the drum body so as to rotate in a counterclockwise direction when viewed from a direction W when the drum 38B is rotated in a clockwise direction.

When one of the spray guns 4A-4C is mounted on the arm 3 of the robot 1 and is moved towards the work to be painted, the hose L is pulled by the gun and the drum body 34 is rotated. Responsive to the rotation of the drum body 34, the drum body 36 is rotated unitarily therewith and the wire 35 is pulled and taken up on the drum body 36. Responsive to the rotation of the drum body 36, the drum body 38A of the reel 38 is also rotated in the clockwise direction and the leaf spring 39 acting against the rotation of the drum body 38A stores an elastic energy. When the painting work is finished and the spray gun is returned to the base 7, the drum body 38A of the reel 38 is rotated in the counterclockwise direction by the the elastic energy stored in the leaf spring 39 and the drum body 34 is rotated together with the rotation of the drum body 36 which is caused by the rotation of the drum body 38A of the reel 38. Thus, the paint supply hose L is taken up on the drum body 34 when the painting work is finished.

Such a take-up mechanism 30 prevents the interference of the hose during the painting work in the robot painting system using a plurality of spray guns and the lifetime of the hose is extended. Further, as the hose is always pulled towards the drum body 34 during the painting work, excessive slackening of the hose which tends to invite unwanted scattering of dust deposited on the hose is prevented. Furthermore, the transportation and storing of the hose becomes easy as the hose is wound on the drum body 34 when it is not used for painting.

Further, the present invention is not limited to those embodiments described heretofore but various variations and modifications may be made without departing from the scope of the present invention. For example, the switches 14 and 27 may be magnetic or optical switch means for detecting the approach of the holder 13.

What is claimed is:

1. A mounting/dismounting system for mounting and dismounting a spray gun on and from an arm of a robot, comprising:

a base extending horizontally and having a flat top surface defined by a first side facing the robot and a second side opposing said first side for supporting said spray gun when the spray gun is dismounted, said flat top surface further being defined with a predetermined position on which the spray gun is to be positioned when the spray gun is waiting for mounting on the arm of the robot;

detecting means provided on the top surface of the base so as to be actuated by the spray gun when the spray gun is moved excessively towards said second side on the top surface and for producing an output signal indicating that the spray gun is displaced from said predetermined position towards said second side of the top surface;

a controller connected to said detecting means and to said robot for stopping the movement of the arm responsive to the output signal from said detecting means;

actuator means mounted on the base at a position below the base and connected to the controller so as to be actuated under control of the controller; and an actuation arm driven by the actuator means, said actuation arm being movable between a first state in which a tip end of the atuation arm is located below the top surface of the base and a second state in which the tip end of the actuation arm is projected upwards beyond the top surface of the base at a horizontal position which is relatively close to the second side of the top surface as compared to that of the tip end of the arm in said first state, said tip end of the actuation arm urging said spray gun placed on the top surface to said predetermined position when the arm is moved from the first state to the second state.

2. A system as claimed in claim 1 in which said detecting means comprises a mechanical switch mounted on the top surface of the base at such a position that the switch is abutted with a part of the spray gun when the spray gun placed on the base is moved towards said second side from said predetermined position.

3. A system as claimed in claim 2 in which the switch carries a leaf spring extending towards the spray gun and located between the swich and the spray gun so that the leaf spring is deformed when the spray gun is abutted to the switch, and the switch is turned ON responsive to the deformation of the leaf spring.

4. A system as claimed in claim 1 further comprising another detecting means connected to said controller and provided on the top surface of the base so as to be actuated by the spray gun when the spray gun is placed on the top surface of the base and has reached another predetermined position slightly offset towards said second side from said predetermined position and for producing an output signal to be sent to the controller indicating that the spray gun is placed on the base at said another predetermined position.

5. A system as claimed in claim 4 in which said another detecting means comprises a mechanical switch mounted on the top surface of the base and having an actuation arm extending horizontally so as to be abutted with a part of the spray gun when the spray gun is placed on the top surface of the base and has moved to said another predetermined position.

6. A system as claimed in claim 4 in which said controller comprises means for stopping the movement of the arm when said another detecting means has produced the output signal indicating that the spray gun has reached said another predetermined position defined on the top surface of the base.

7. A system as claimed in claim 6 in which said controller comprises means for moving the arm away from the spray gun when said another detecting means has produced the output signal.

8. A system as claimed in claim 1 in which said actuator means is an air cylinder having an actuation rod, and said actuation arm is a swing arm pivotted rotatably and having a first arm portion having an end connected to the actuation rod and a second arm portion having said tip end.

9. A system as claimed in claim 8 in which the second arm portion is branched into two arm branches each having said tip end.

10. A system as claimed in claim 1 in which said base has a U-shaped cutout at the first side so as to allow entrance of a mechanism carried on a tip end of the arm of the robot when the the robot moves the arm towards the spray gun on the base.

11. A system as claimed in claim 1 in which said base further has a leaf spring extending on the top surface of the base generally towards the second side for centering the spray gun on the base.

* * * * *